(12) United States Patent
Bernardini et al.

(10) Patent No.: US 8,234,486 B2
(45) Date of Patent: Jul. 31, 2012

(54) MANAGING REBOOT OPERATIONS

(75) Inventors: Gianluca Bernardini, Guidonia Rome (IT); Michele Crudele, Rome (IT)

(73) Assignee: International Business Machines Corporation, Armonk, NY (US)

( * ) Notice: Subject to any disclaimer, the term of this patent is extended or adjusted under 35 U.S.C. 154(b) by 747 days.

(21) Appl. No.: 12/209,778

(22) Filed: Sep. 12, 2008

(65) Prior Publication Data

US 2009/0077367 A1   Mar. 19, 2009

(30) Foreign Application Priority Data

Sep. 14, 2007   (FR) .................................... 07 116399

(51) Int. Cl.
*G06F 9/00* (2006.01)
*G06F 15/177* (2006.01)
*G06F 1/00* (2006.01)
*G06F 1/26* (2006.01)
*G06F 1/32* (2006.01)

(52) U.S. Cl. ............. 713/2; 713/300; 713/310; 713/320

(58) Field of Classification Search .................. 713/2, 1, 713/300

See application file for complete search history.

(56) References Cited

U.S. PATENT DOCUMENTS

| | | | |
|---|---|---|---|
| 5,410,706 A | 4/1995 | Farrand et al. | |
| 5,949,974 A | 9/1999 | Ewing et al. | |
| 6,829,704 B2 | 12/2004 | Zhang et al. | |
| 6,948,165 B1 | 9/2005 | Luu et al. | |
| 6,965,953 B2 | 11/2005 | Kujirai | |
| 7,000,102 B2 * | 2/2006 | Kumar et al. | 713/2 |
| 7,017,085 B2 | 3/2006 | Braun | |
| 7,146,515 B2 | 12/2006 | Harrington et al. | |
| 7,313,684 B2 | 12/2007 | O'Connell | |
| 7,412,467 B2 | 8/2008 | Yang | |
| 7,430,735 B1 | 9/2008 | Balakrishnan et al. | |
| 7,487,402 B1 | 2/2009 | Donaldson et al. | |
| 7,558,986 B2 | 7/2009 | Abe | |
| 7,827,395 B2 | 11/2010 | Suzuki | |
| 8,122,447 B2 | 2/2012 | Cohen | |
| 2002/0092010 A1 | 7/2002 | Fiske | |
| 2004/0025045 A1 | 2/2004 | Chan | |
| 2004/0030881 A1 | 2/2004 | Harrington | |
| 2004/0117609 A1 * | 6/2004 | Stalker et al. | 713/2 |
| 2005/0102540 A1 | 5/2005 | Kim | |
| 2005/0229039 A1 | 10/2005 | Anderson | |
| 2006/0041658 A1 | 2/2006 | Nelson | |
| 2006/0053417 A1 * | 3/2006 | Henderson et al. | 717/168 |
| 2006/0200691 A1 * | 9/2006 | Yomo et al. | 713/323 |
| 2008/0028391 A1 | 1/2008 | Nallipogu | |
| 2008/0126792 A1 | 5/2008 | Herington | |
| 2010/0223451 A1 * | 9/2010 | Hitaka et al. | 713/2 |

* cited by examiner

*Primary Examiner* — Thomas Lee
*Assistant Examiner* — Samantha Hoang
(74) *Attorney, Agent, or Firm* — Brevetto Law Group

(57) ABSTRACT

The disclosure provides a mechanism which is activated when a user opts to hibernate their computer (at the end of the day) rather than switching it off. In particular, on receipt of a hibernate request, an embodiment provides a mechanism for determining whether (as a result of, for example, a distribution or installation of software to a computer) there are any outstanding reboot operations for the computer.

If there are any outstanding reboot operations for the computer, an embodiment advises the user of the fact; and allows the user to reconsider whether or not they wish to shut the computer down (or reboot the computer), or hibernate the computer. An embodiment then reboots the computer or hibernates the computer in accordance with the user's wishes.

16 Claims, 2 Drawing Sheets

MANAGING REBOOT OPERATIONS

TECHNICAL FIELD

This disclosure relates to managing reboot operations; and in particular, to managing a one or more reboot operations for a computer.

BACKGROUND

Installation of software to end-user computers is a frequent task in large, distributed IT environments. The process of updating critical software (e.g. a security patch) on a target computer usually necessitates the rebooting of the target computer (e.g. to remove and/or replace files used during the normal operation of the computer).

SUMMARY

According to one embodiment of the disclosure there is provided a method of managing a one or more reboot operations for a computer, the method comprising the steps of: receiving a hibernate request for the computer; identifying the presence of a one or more outstanding reboot operations for the computer; notifying a user of the outstanding reboot operations; suspending the hibernate request and performing a recovery action. According to an embodiment of the invention the recovery action includes: allowing the user to choose whether to reboot the computer or hibernate the computer; and rebooting or hibernating the computer in accordance with the user's choice.

This enables a reboot operation at the end of a working-session (i.e. when the end-user issues a hibernate request), rather than at the beginning of a new session (i.e. when the end-user later restores the system). Accordingly, if a one or more reboots are required, an end-user is less likely to complain about having to shut down their computer, rather than hibernating it.

DRAWING DESCRIPTION

Figure 1:
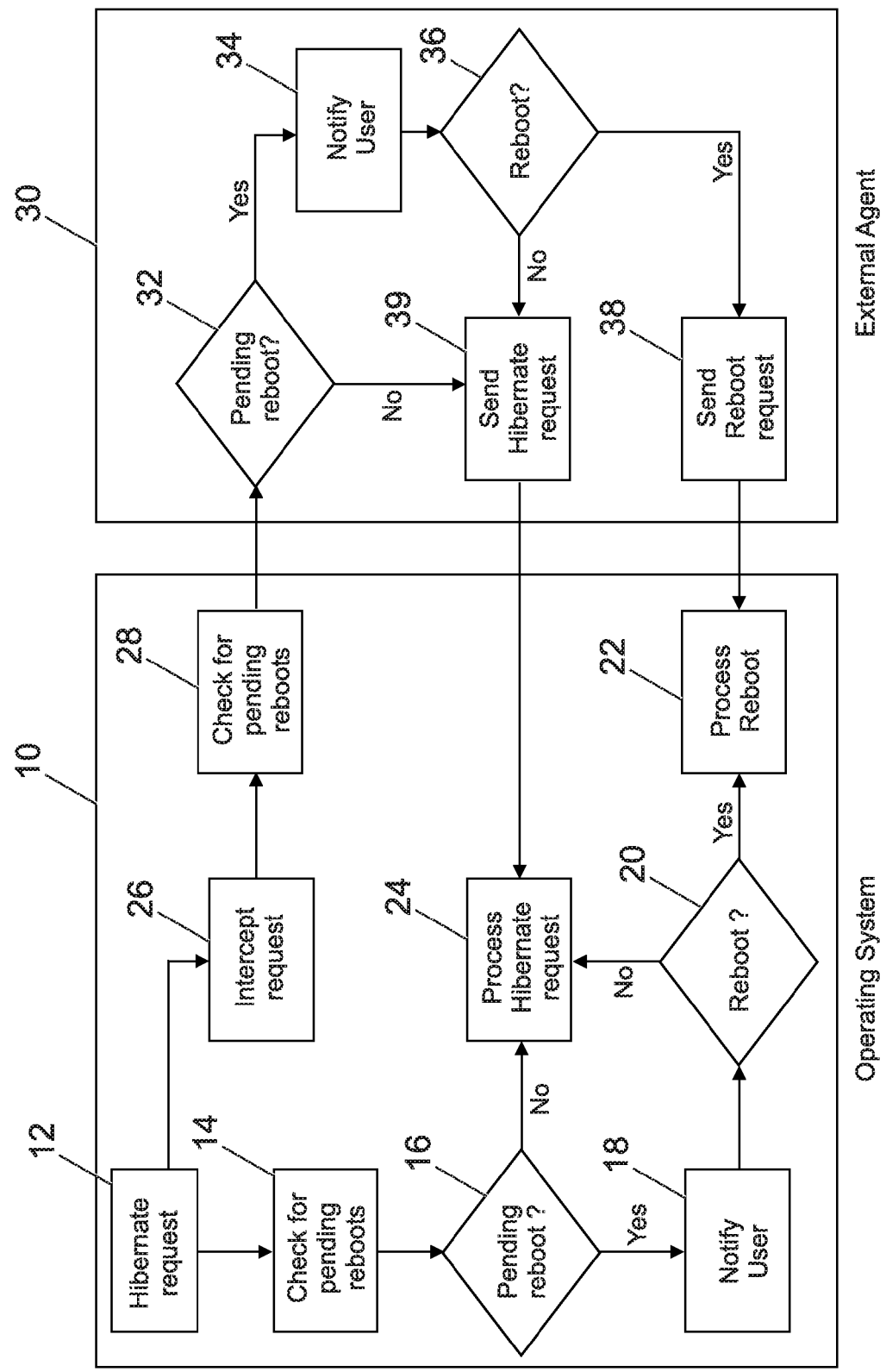
Figure 2:
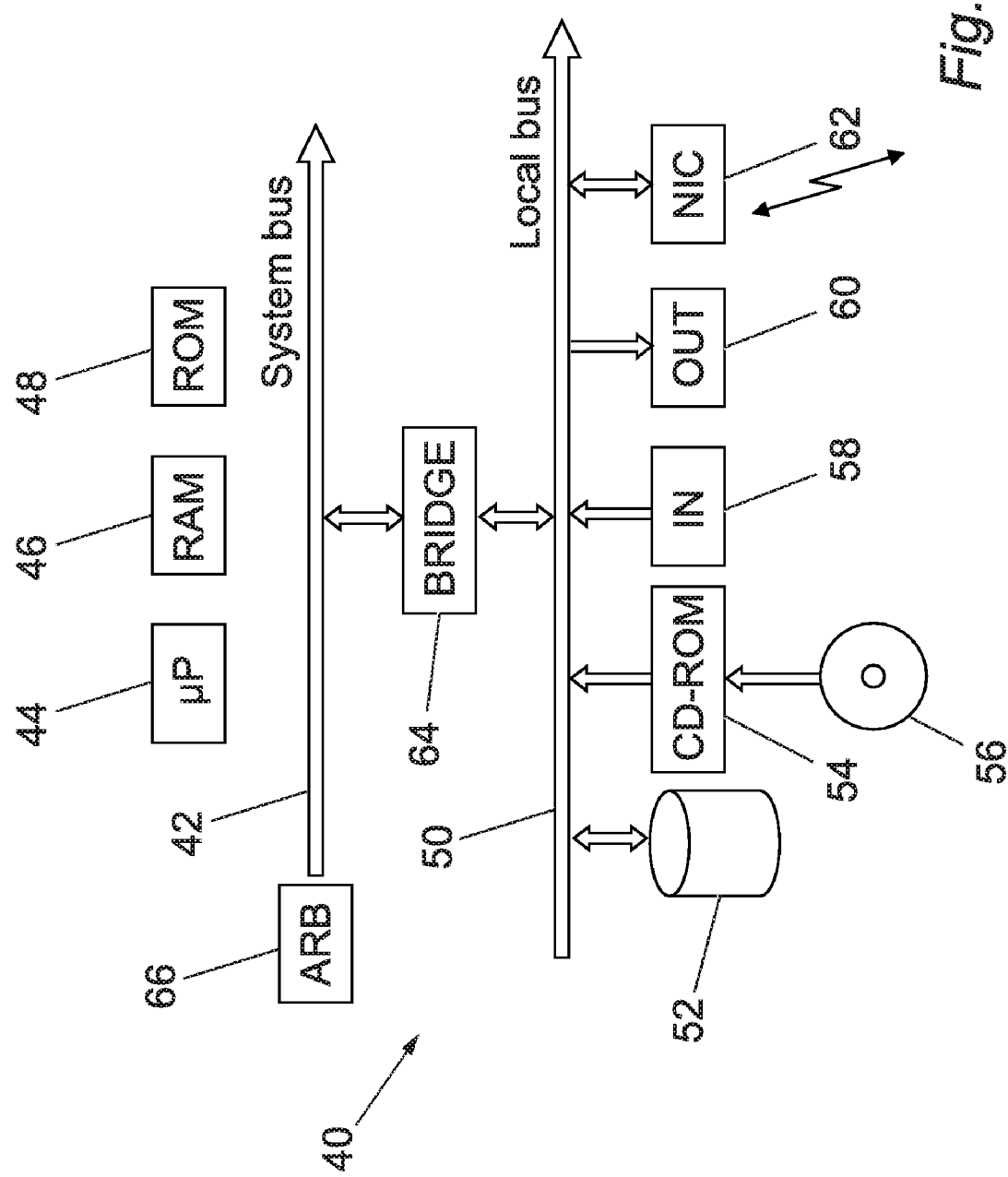

Embodiments of the invention will now be described by way of example only, with reference to the accompanying Figures in which:

FIG. 1 is a flowchart of the operation of a first and second implementation of an embodiment; and FIG. 2 is a block diagram of a computer on which an embodiment may operate.

DETAILED DESCRIPTION

The inventors have recognized that it may be difficult to automatically reboot a laptop computer at night when no one is using it, because laptop computers are frequently only connected to a network when a user is at work.

For example, software distribution products may advise a user to restart their computer to complete an installation. Furthermore, these products may provide an option for restarting a computer at a later (more convenient) time. However, on finishing for the day, users may hibernate their computers' rather than completely shutting them down (e.g. because it is faster to resume the computer the next day instead of going through the whole process of re-starting the computer). Indeed, users may be unaware of the difference between hibernation and shutdown, in which case, the users may be unaware of the necessity for shutting down a computer to enable the completion of a software installation thereto. Thus, an installation may never be completed to these computers; and in the case of security patch updates, the working environment in the computers could no longer be safe. Thus, the end-user may eventually call a Help Desk for assistance.

An embodiment may provide an operating system with a mechanism for recognizing the presence of a one or more software update operations to be completed on a computer. An embodiment may advise the operating system that it may not be safe simply to hibernate the computer. An embodiment may provide a mechanism whereby the computer will prompt a user that the environment is not safe; and that the computer must be restarted rather than hibernated. An embodiment may provide a mechanism for automatically shutting down a computer, in response to a hibernate request if there are software updates (changes) still to be applied.

In an embodiment, a software distribution agent may be provided with a mechanism for remembering that a shutdown must be performed. The software distribution agent may subscribe for a hibernate event; and on receipt of such an event, the agent may issue a message to the user advising the user to shutdown the computer.

An embodiment is described below within the context of a Windows (trade mark) implementation. However, it will be appreciated that embodiments are not limited to this implementation. In particular, it will be understood that the embodiments are equally applicable to any operating systems which offer the possibility of hibernating the system, including, but not restricted to, UNIX (trademark) and LINUX (trademark) etc.

Within a Windows (trade mark) operating system, when an event related to power management is triggered, the operating system may transmit a WM_POWERBROADCAST broadcast message to notify the applications about the event (further information is available from msdn2.microsoft.com/en-us/Library/aa373201.aspx). This event can be intercepted and blocked to enable some ad-hoc processing. In an embodiment, this processing includes:

notifying a user of an outstanding required reboot;
processing the hibernate request according to a default behavior.

Referring to FIG. 1, an embodiment could be implemented in multiple ways. In an implementation (shown in box 10), an embodiment is part of a computer's operating system. In this case, on issuance of a hibernate request 12, the embodiment may check 14 for any outstanding reboot operations. If 16 there are any outstanding reboot operations for the computer in question, an embodiment may notify 18 the user of the fact, and may request the user to advise whether they still want to proceed with the hibernation operation, or would prefer to reboot the computer.

If 20 the user chooses to reboot the computer, the preferred embodiment processes 22 the reboot operation. However, if 20 the user chooses to continue with the hibernation operation, the preferred embodiment processes 24 the hibernation request. Similarly, if 16 there are no outstanding reboot operations for the computer, the preferred embodiment simply processes 24 the hibernation request. An embodiment may intercept 26 the hibernate request prior to checking 28 for outstanding reboot operations.

In another implementation (shown in box 30), an embodiment may be provided in a separate agent, which may be able to subscribe to power management events and to intercept them to notify the user about pending reboots. In this case the implementation could be included within the Software Installation Engine of the Tivoli Configuration Manager. If 32 (on intercepting 26 a hibernate request and checking 28 for outstanding reboot operations) the agent determines that there is a one or more outstanding reboot operations, the agent may notify 34 the user of the fact; and may request the user to advise whether they still want to process with the hibernation operation, or would prefer to reboot the computer. If 36 the user chooses to reboot the computer, the agent may send 38 a reboot request to the operating system which may then process 22 the request. However, if 36 the user chooses to continue with the hibernation operation, the agent may send 39 a hibernation request to the operating system, which may then process 24 the hibernation request. Similarly, if 32 there are no outstanding reboot operations for the computer, the agent may simply send 39 a hibernation request to the operating system, which may then process 24 the hibernation request.

A machine on which an embodiment may operate may have a generic structure shown in FIG. 2. More particularly, an example of a generic computer of the system is denoted with 40. The computer 40 may be formed by several units that are connected in parallel to a system bus 42. In detail, one or more microprocessors 44 may control operation of the computer 40; a RAM 46 may be directly used as a working memory by the microprocessors 44, and a ROM 48 may store basic code for a bootstrap of the computer 40. Peripheral units may be clustered around a local bus 50 (by means of respective interfaces). Particularly, a mass memory may consist of a hard-disk 52 and a drive 54 for reading CD-ROMs 56. Moreover, the computer 40 may include input devices 58 (for example, a keyboard and a mouse), and output devices 60 (for example, a monitor and a printer). A Network Interface Card (NIC) 62 may be used to connect the computer 40 to the network. A bridge unit 64 may interface the system bus 42 with the local bus 50. Each microprocessor 44 and the bridge unit 64 can operate as master agents requesting an access to the system bus 42 for transmitting information. An arbiter 66 may manage the granting of the access with mutual exclusion to the system bus 42.

Embodiments may take the form of an entirely hardware embodiment, an entirely software embodiment or an embodiment containing both hardware and software elements. An embodiment that is implemented in software may include, but is not limited to, firmware, resident software, microcode, etc.

Furthermore, embodiments may take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system, (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure for various embodiments with various modifications as are suited to the particular use contemplated.

The invention claimed is:

1. A method comprising:
   receiving a hibernate request for a computer;
   intercepting the hibernate request;
   identifying a presence of one or more outstanding reboot operations for the computer;
   notifying a user of the presence of the one or more outstanding reboot operations;
   requesting the user to select either to reboot the computer or continue to hibernate the computer;
   upon receiving an input indicating to reboot the computer, performing the one or more outstanding reboot operations; and
   upon receiving an input indicating to continue to hibernate, processing the hibernate request.

2. The method of claim 1, further comprising: receiving an input from the user indicating a choice of one of rebooting the computer or hibernating the computer.

3. The method of claim 2, wherein the intercepting is performed by a software distribution agent.

4. The method of claim 2, wherein a software distribution agent provides a prompt for the user to choose one of rebooting the computer and hibernating the computer.

5. The method of claim 1,
   wherein the identifying a presence of a one or more outstanding reboot operations for a computer is performed in response to receiving the hibernate request; and
   wherein the identifying a presence of a one or more outstanding reboot operations for a computer is performed by a software distribution agent.

6. The method of claim 1, wherein the notifying the user of the presence of the one or more of the outstanding reboot operations is performed by a software distribution agent.

7. The method of claim 1, further comprising:
   sending, by a software distribution agent, one of a reboot request and the hibernate request to an operating system of the computer.

8. The method of claim 1, wherein said requesting step further comprises an option to continue to hibernate the computer and reboot the computer at a later time, the method further comprising:
   upon receiving an input indicating to continue to hibernate the computer and reboot the computer at a later time, performing the one or more outstanding reboot operations at said later time.

9. A computer program product comprising:
a non-transitory computer-readable storage medium including instructions to:
- receive a hibernate request for a computer;
- intercept the hibernate request;
- identify a presence of one or more outstanding reboot operations for the computer;
- notify a user of the presence of the one or more outstanding reboot operations;
- request that the user to select either to reboot the computer or continue to hibernate the computer;
- upon receiving an input indicating to reboot the computer, perform the one or more outstanding reboot operations; and
- upon receiving an input indicating to continue to hibernate, process the hibernate request.

10. The computer program product of claim 9, further comprising:
receiving an input from the user indicating a choice of one of rebooting the computer or hibernating the computer.

11. The computer program product of claim 10, wherein the intercepting is performed by a software distribution agent.

12. The computer program product of claim 9, wherein the instruction to request further comprise an option to hibernate the computer and reboot the computer at a later time, the instructions further comprising:
upon receiving an input indicating to continue to hibernate the computer and reboot the computer at a later time, perform the one or more outstanding reboot operations at said later time.

13. A system comprising:
a processor; and
a memory, wherein the memory includes instructions executable by the processor to:
- receive a hibernate request for a computer;
- intercepting the hibernate request;
- identify a presence of one or more outstanding reboot operations for the computer;
- notify a user of the presence of the one or more outstanding reboot operations;
- request that the user to select either to reboot the computer or continue to hibernate the computer;
- upon receiving an input indicating to reboot the computer, perform the one or more outstanding reboot operations; and
- upon receiving an input indicating to continue to hibernate, process the hibernate request.

14. The system of claim 13, further comprises:
receiving an input from the user indicating a choice of one of rebooting the computer or hibernating the computer.

15. The system of claim 14, wherein the intercepting is performed by a software distribution agent.

16. The system of claim 13, wherein the instruction to request further comprise an option to hibernate the computer and reboot the computer at a later time, the instructions further comprising:
upon receiving an input indicating to continue to hibernate the computer and reboot the computer at a later time, perform the one or more outstanding reboot operations at said later time.

* * * * *